April 6, 1954      B. E. SOOY      2,674,123
TESTING DEVICE FOR PERFORATIONS
Filed Dec. 5, 1951      2 Sheets-Sheet 1
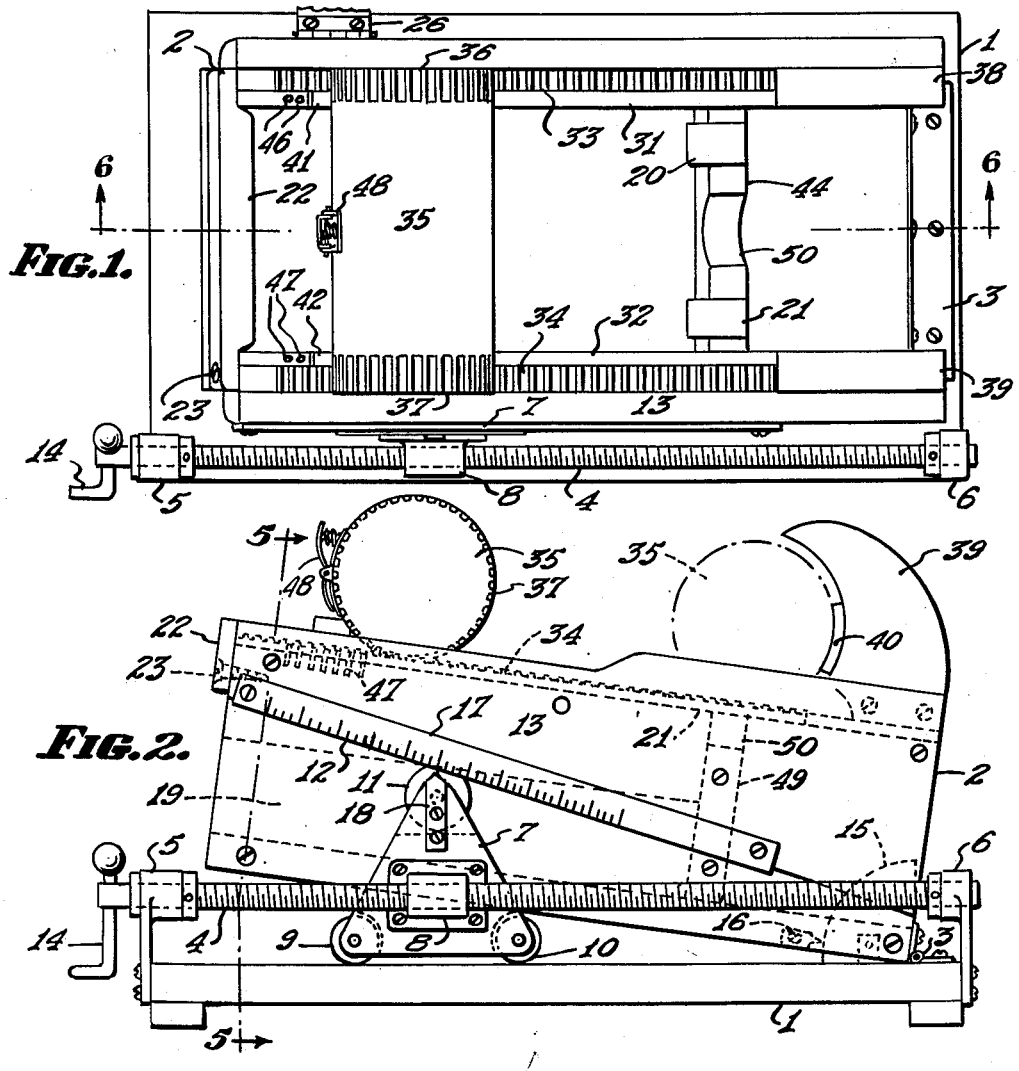
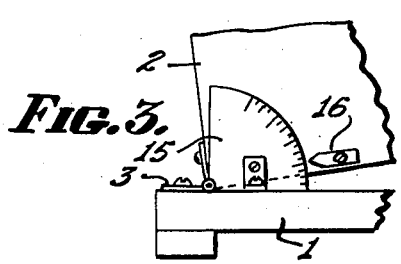
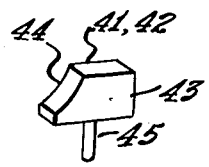
INVENTOR.
BRAINARD E. SOOY,
BY Allen & Allen
ATTORNEYS.

April 6, 1954 B. E. SOOY 2,674,123
TESTING DEVICE FOR PERFORATIONS
Filed Dec. 5, 1951 2 Sheets-Sheet 2
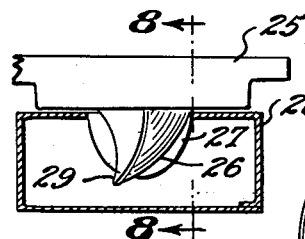
FIG. 7.
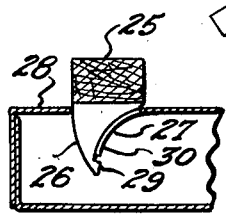
FIG. 8.
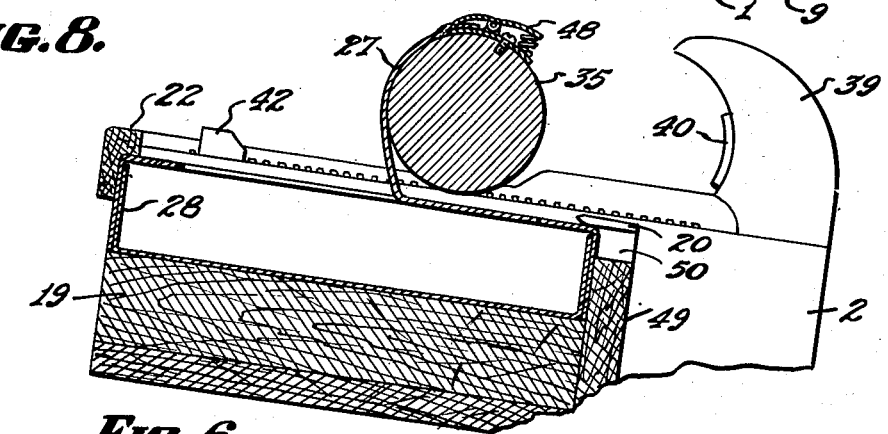
FIG. 5.
FIG. 6.
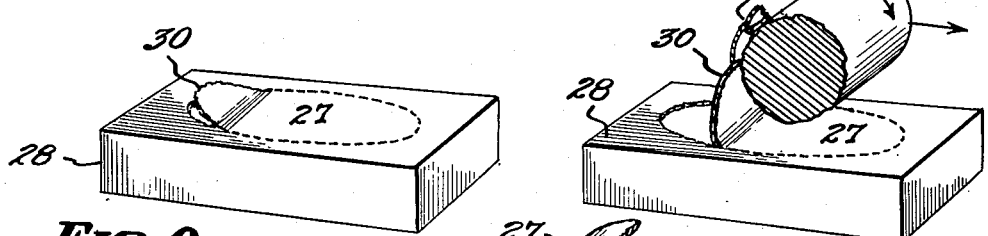
FIG. 9.    FIG. 10.
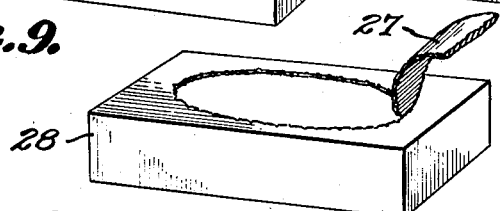
FIG. 11.
INVENTOR.
BRAINARD E. SOOY,
BY
Allen & Allen
ATTORNEYS.

Patented Apr. 6, 1954

2,674,123

UNITED STATES PATENT OFFICE

2,674,123

TESTING DEVICE FOR PERFORATIONS

Brainard E. Sooy, Middletown, Ohio, assignor to The Gardner Board and Carton Co., Middletown, Ohio, a corporation of Ohio Application December 5, 1951, Serial No. 260,027

11 Claims. (Cl. 73—96)

My invention relates to a device and methods for testing the quality of the perforations forming tearouts on the tops of boxes used for facial tissues and the like. In such boxes it is customary to provide a tearout for enabling the user to conveniently open the box and remove the tissues as desired.

It is customary in the industry for the tissue manufacturer to set a standard for the quality of the perforations forming the tearout based on the number of failures of the perforations per hundred boxes tested, and failure of 5% or less of the boxes tested is generally considered satisfactory. Failure is determined by whether or not the tearout can be removed from the box without tearing portions of the box lying beyond the tearout or causing portions of the box lying beyond the tearout to rupture into two layers or strata.

A need has long been felt in the industry for an accurate method of testing the perforation quality of tearouts in boxboard cartons. In the past the testing procedure has been for a tester to hold a glued and set up carton firmly against the body with one hand, sharply break the perforations of the tearout on the end nearest the body by impinging the fingers against the end of the tearout, then lifting the ruptured end upwardly and outwardly of the box, grasping the ruptured end firmly between the thumb and forefinger and quickly pulling upwardly until the tearout has been completely disengaged from the box. This procedure, accurately done, will furnish a good test; and in fact, it is the final test, for the user must follow some such method in opening the box. However, for testing purposes and the proper evaluation of quality, this method has several serious drawbacks due to the variability of the human element involved. One person tends to test one way and another person a slightly or even a significantly different way, often resulting in a widely different result, and the primary need is for a test which eliminates the human element of error and assures constant testing results regardless of who conducts the test.

There are a number of serious objections to the testing procedure just described. Primary among these objections is the lack of uniformity in the portion of the tearout opened in the first stage of the test. It is exceedingly difficult for the tester to open exactly the same size portion of the tearout in each box and to be sure that one side of the tearout does not tear back farther than the other. Another important objection to past testing methods is that the angle at which the pull is applied to remove the tearout from the box is not constant, and variance of the angle may cause apparent failure of the perforations on boxes which are in reality properly perforated. Another disadvantage of the past procedure is that the speed and/or the force used in snapping out the tearout may vary considerably, whereas it should be constant or as nearly constant as possible on each test.

It is a principal object of my invention to provide a testing device and procedure which will eliminate the difficulties enumerated above.

It is a further object of my invention to provide a testing procedure in which all variables excepting the strength and quality of the perforations are known and controllable, thereby bringing the testing of the perforations within the realm of statistical quality control.

These and other objects of my invention which will be apparent to one skilled in the art upon reading the specifications, I accomplish by that mechanism and in the practice of those procedures of which I shall now set forth certain exemplary embodiments.

Reference is made to the accompanying drawing, wherein:

Figure 1 is a plan view of my testing device.

Figure 2 is a side elevation of the device shown in Figure 1.

Figure 3 is a fragmentary side elevation of the means for determining the angle of inclination of the testing device.

Figure 4 is a perspective view of a stop for the testing cylinder.

Figure 5 is a sectional view taken along the line 5—5 of Figure 2.

Figure 6 is a partial sectional view taken along the line 6—6 of Figure 1.

Figure 7 is a vertical section illustrating the puncturing means for rupturing the perforations at one end of the tearout in the initial step of the test.

Figure 8 is a sectional view taken along the line 8—8 of Figure 7.

Figure 9 is a perspective view illustrating a test box with the tearout in its initially ruptured condition.

Figure 10 is a perspective view similar to Figure 9 illustrating in diagrammatic fashion the manner in which the ruptured end of the tearout is attached to the testing cylinder.

Figure 11 is another perspective view similar to Figure 9 illustrating the tearout as it is snapped out or disengaged from the box.

Briefly, in the practice of my invention, I provide a testing device comprising a cradle made to the proper dimensions so as to provide a snug fit for a folded and set up tear top box. The cradle is hinged at one end to a base member in such fashion that the angle of inclination between the cradle and the base member may be adjusted between 0° and 90°. Screw means are provided to raise and lower the cradle relative to the base as desired, and suitable means are provided for determining the angle of inclination between the cradle and the base.

Along the top rails of the cradle and at such a height as to permit a rolling cylinder to clear the top of the box being tested, gear racks are mounted and the ends of the rolling cylinder are cut with corresponding teeth to engage the racks, thus providing for positive rolling contacts of the cylinder along the top rails of the cradle when the latter is inclined. Suitable stop means are provided at the end of the cradle to stop the free-roll of the cylinder.

A puncturing means is connected to one side of the cradle for initially puncturing the tearout in the box being tested, the puncturing means being provided with a lip for lifting the ruptured end of the tearout upwardly and outwardly of the box. Suitable clamping means are provided on the rolling cylinder for clamping the end of the tearout to the rolling cylinder, whereupon when the rolling cylinder is released for rolling movement over the cradle, the rolling movement of the cylinder causes the tearout to be removed from the box. With this arrangement, the variables heretofore noted are either maintained constant or controlled, thus providing an accurate means for measuring the quality of the perforations.

Referring to Figures 1 and 2 of the drawings, I have shown a base 1 to which the cradle 2 is pivoted by means of hinge 3. The cradle is inclined by means of the screw 4 journaled in the brackets 5 and 6 secured to the base 1 and the carriage 7 having an internally threaded sleeve portion 8 adapted to receive the threads of screw 4. The carriage 7 is provided with wheels 9 and 10 which ride on the base 1, and the wheel 11 which contacts the under, inclined surface 12 of side guide 13. A crank handle 14 is attached to the end of screw 4 for turning the screw and thereby moving the carriage 7. As the carriage moves along the screw the wheel 11 moves along the under, inclined surface 12 of the side guide 13 thereby causing the cradle to be moved upwardly or downwardly depending upon the direction of motion of the carriage.

As seen in Figure 3, a scale 15 is attached to the base 1 adjacent the pivot point of the cradle and a pointer 16 is secured to the cradle 2 for indicating the angle of inclination of the cradle relative to the base 1. In addition, a calibrated scale 17 may be secured to the side guide 13 and a pointer 18 attached to the carriage 7 as seen most clearly in Figure 2, for control purposes.

The cradle is preferably made to the proper dimensions of the particular box being tested, although a spacer block 19 such as seen in Figures 5 and 6 may be employed to accommodate boxes of different depths. It will be evident that spacers can be employed at the side and end of the cradle to accommodate boxes of various dimensions. The box being tested is clamped in place in the cradle by means of the tongues 20 and 21 at one end and the clamping member 22 at the other end. As seen in Figure 1, the clamping member 22 is pivoted to the cradle at 23 and hence is adapted to swing across the end of the cradle to hold the box in position.

The side of the cradle opposite the carriage 7 is also provided with a side guide 24 which is similar in construction to the side guide 13, and this side guide has pivotally attached to it a bar 25 hinged to the side guide 24 by means of hinge 26. The bar 25 carries on its undersurface a tusk 26 which, when the bar 25 is swung across the cradle, serves to puncture the box by breaking the perforations at one end of the tearout. The tusk 26, being in predetermined fixed position relative to the cradle, will uniformly puncture each box properly positioned in the cradle and consequently the portion of the tearout opened on each box will be the same.

As seen in Figure 7, the tearout 27 of the box 28 is punched downwardly by the tusk 26; and, as best seen in Figure 8, the tusk 26 is provided with a projecting tip 29 which will engage the edge 30 of tearout 27 as the tusk is withdrawn from the box, thereby lifting the ruptured end of the tearout upwardly and outwardly of the box. Upon withdrawal of the tusk from the box, the box will appear as shown in Figure 9 of the drawings.

As can be best seen in Figures 1 and 5, the side guides 13 and 24 are cut away adjacent the top rails 31 and 32 of the cradle and the gear racks 33 and 34 are fitted in the cut away portions of the side guides. A rolling cylinder 35 rests on the top rails 31 and 32 and the ends of the cylinder are cut with teeth 36 and 37 of a size to engage the gear racks 33 and 34, thus providing for positive rolling contact of the cylinder along the top of the cradle when the latter is inclined. The roller cylinder 35 is held against axial movement by the side guides 13 and 24 which extend above the gear racks, as can be clearly seen in Figures 2 and 5 of the drawings.

The cylinder itself may be made of any suitable metal. Steel has been found satisfactory. The weight of the cylinder will normally be about four pounds, although it will vary depending upon the thickness and type of board from which the boxes being tested are made. A cylinder having a diameter of approximately 3.5 inches has been found to be suitable in most instances, although this factor may also be varied.

The cylinder 39 is caught and stopped at the end of its forward movement by the fixed stops 38 and 39 which may be provided with cushions 40. At the opposite end of the cradle the cylinder 35 comes to rest against the stops 41 and 42 which are adjustable to permit the cylinder 35 to be stopped at a predetermined fixed position relative to the end of the tearout lifted up by the tusk 26. As seen in Figure 4 of the drawings, the stops 41 and 42 each comprise a block 43 having an accurate portion 44 adapted to be contacted by an end of the cylinder 35. A pin 45 projects from the block 43 and is adapted to be engaged in any one of the series of holes 46 or 47 in the top rails 31 and 32, respectively.

The rolling cylinder 35 is provided with a spring clip 48 for clamping the freed end of the tear-out to the rolling cylinder. The cross piece 49 which supports the tongues 20 and 21 may be cut out as at 50 to accommodate the spring clip should it be undermost when the cylinder reaches the fixed stops 38 and 39.

In the operation of the device a box, such as the box 28, is placed in the cradle and locked in position by means of the tongues 20 and 21 and the clamping member 22. The top of the box is then punctured by the tusk 26 so as to free one end of the tearout 27. The roller cylinder 35 is next moved along the gear racks 33 and 34 until it comes to rest against the stops 41 and 42. The position of the cylinder 35 on the gear racks is such that when the cylinder contacts the stops, the spring clip 48 will be in position to clamp the end of the tearout freed by the tusk 26 to the cylinder. Upon release of the cylinder for movement along the inclined cradle, the cylinder will cause the tear out to be pulled completely free of the box.

The box is diagrammatically illustrated in Figures 10 and 11 of the drawings wherein, in Figure 10, the tearout is shown partially disengaged from the box by the cylinder, and in Figure 11, the tearout is seen as the cylinder nears the end of its forward movement.

There are two distinct methods of testing boxes using my device, and these two methods are as follows:

1. *The fast roll test.*—In this test the angle of inclination of the cradle is preferably set at approximately 38° to 40° whereupon the disengaged end of the tearout is secured to the spring clip on the roller cylinder. The roller cylinder is then released for movement along the inclined cradle. At the stated angle of inclination the force exerted by the moving cylinder on the perforations of the tearout is sufficient to snap the tearout from the box at considerable speed. The test thus simulates the hand removal of the tearout and is significant in that it demonstrates the real quality of the perforations. If the perforations are correct, the tearout will snap out cleanly and quickly. If there are defects present, such as missing teeth in the perforating rule which formed the perforations, poor cutting or the like, these defects will be apparent in that the tearout will be removed imperfectly. Thus, the characteristic determined by the fast roll test is the ability of the tearout to be removed from the box, whether perfectly or imperfectly.

2. *The slow roll test.*—In this test the angle of inclination of the cradle is set at a nominal angle of inclination, such as, for example, 14°, and the disengaged end of the tearout secured to the cylinder. After engagement of the tearout with the cylinder, the angle of inclination of the cradle is gradually and steadily increased by cranking the handle 14 until the perforations begin to break. The amount of force required to break the perforations can be read from the calibrated scale 17, predetermined values having been assigned to the calibrations on the scale based on the weight of the rolling cylinder and the angle of inclination, both of which are known factors. The test thus gives a direct reading of the strength characteristics of the perforations. Also, by noting the roll of cylinder, i. e. whether it is steady or intermittent, an indication of the uniformity of the perforation strength can be observed. If the cylinder rolls a short distance and stops, the angle of inclination may be increased slowly until the cylinder again begins to roll, and a new strength reading taken from the scale.

The slow roll test just described makes possible the determining of mathematical values for perforation testing, thus making it possible to apply statistical quality controls in the manufacture of tearout boxes. It also enables the carton manufacturer to set proper limits of tolerance and thus aids in establishing true control of perforation quality.

Modifications may, of course, be made in my invention without departing from the spirit of it. While I have described my invention as applied to the testing of oval tearouts, it will be understood that the invention is equally applicable to the testing of tearouts of various other configurations.

Having thus described my invention in certain exemplary embodiments, what I claim as new and desire to secure by Letters Patent is:

1. In a device for testing the perforation quality of boxes having tearout openings therein, a base, a cradle pivoted to said base for receiving a box to be tested, said cradle having upwardly extending portions constituting guide ways, a roller resting on said guide ways, means on said roller for attaching the end of a tearout portion thereto, and means movable longitudinally of and contacting both said cradle and said base for inclining said cradle relative to said base due to movement of said means toward the pivot of said cradle to cause said roller to move along said guide ways.

2. In a device for testing the perforation quality of boxes having tearout openings therein, a base, a cradle pivoted to said base for receiving a box to be tested, said cradle having upwardly extending portions on opposite sides thereof constituting guide ways, each of said guide ways including a gear rack, a cylindrical roller resting on said guide ways and having teeth to engage said gear racks, means on said roller for attaching the end of a tearout portion thereto, and means movable longitudinally of and contacting both said cradle and said base for inclining said cradle relative to said base due to movement of said means toward the pivot of said cradle to cause said cylindrical roller to move along said guide ways, said gear racks and teeth providing for positive rolling contact of said cylindrical roller with said guide ways.

3. In a device for testing the perforation quality of boxes having tearout openings therein, a base, a cradle pivoted to said base for receiving a box to be tested, said cradle having upwardly extending portions on opposite sides thereof constituting guide ways, each of said guide ways including a gear rack, a cylindrical roller resting on said guide ways and having teeth to engage said gear racks, means on said roller for attaching the end of a tearout portion thereto, fixed stops at one end of said guide ways to stop said roller at the end of its forward movement, and adjustable stop means at the opposite ends of said guide ways to establish a predetermined starting position for said cylindrical roller, and means movable longitudinally of and contacting both said cradle and said base for inclining said cradle relative to said base due to movement of said means toward the pivot of said cradle to cause said cylindrical roller to move forwardly over said guide ways.

4. In a device for testing the perforation quality of boxes having tearout openings therein, a base, a cradle pivoted to said base for receiving a box to be tested, said cradle having upwardly extending portions on opposite sides thereof constituting guide ways, a roller resting on said guide ways for movement therealong, means on said roller for attaching the end of a tearout portion thereto, a screw having a crank handle mounted on said base, a carriage movable over said base, said carriage having a portion in engagement with said screw whereby said screw will drive said carriage, said cradle having an inclined rail contacted by said carriage whereby said carriage will also move along said inclined rail and thereby cause said cradle to be inclined relative to said base.

5. The structure claimed in claim 4 including a calibrated scale lying along said inclined rail, and a pointer for said scale mounted on said carriage.

6. The structure claimed in claim 5 including a scale mounted on said base for determining the angle of inclination of said cradle, said scale having a pointer mounted for movement with said cradle.

7. In a device for testing the perforation quality of boxes having tearout openings therein, a support, a cradle pivoted for movement in a vertical plane relative to said support, said cradle having guide ways extending along opposite sides thereof, a roller resting on said guide ways for movement therealong, means on said roller for attaching an end of the tearout portion thereto, means for positioning a box in said cradle in predetermined fixed position, and means mounted on said cradle for disengaging an end portion of a tearout in the box being tested, said last mentioned means including means for lifting the disengaged portion of the tearout upwardly away from the box.

8. In a device for testing the perforation quality of boxes having tearout openings therein, a support, a cradle pivoted for movement in a vertical plane relative to said support, means for positioning a box in said cradle in predetermined fixed position, an arm pivoted to said cradle at one side thereof and swingable across the top of said cradle, said arm having a tusk on the under side thereof for puncturing a predetermined uniform portion of the tearout in the top of a box placed in said cradle along the tearout perforations therein, said tusk having a projecting tip for engaging and lifting upwardly the portion of the box punctured by said tusk, a roller mounted for movement over the top of said cradle, and means on said roller for attaching the end of the punctured portion of the tearout opening thereto.

9. In a device for testing the perforation quality of boxes having tearout openings therein, a support, a cradle pivoted for movement in a vertical plane relative to said support, said cradle having guide ways extending along opposite sides thereof, a roller resting on said guide ways for movement therealong, means on said roller for attaching the end of a tearout portion thereto, means for positioning a box in said cradle in predetermined fixed position, and means mounted on said cradle for disengaging a predetermined uniform end portion of tearout in the box being tested, said last mentioned means comprising an arm pivoted to said cradle at one side thereof and swingable across the top of said cradle, said arm having a tusk on the under side thereof for puncturing the top of a box placed in said cradle along lines of perforation therein defining a tearout opening, said tusk having a projecting tip for engaging and lifting upwardly the portion of the box punctured by said tusk.

10. In a device for testing the perforation quality of boxes having tearout openings therein, a base, a cradle pivoted at one end to said base for receiving and positioning a box to be tested, said cradle having roller supporting members extending along opposite sides thereof, a cylindrical roller resting on said supporting members, interengaging means on said roller and said supporting member to cause said roller to roll along said supporting members without slipping, means on said roller for attaching the end of a tearout portion thereto, and means contacting said base and said cradle for pivoting said cradle relative to said base whereby to incline said cradle and thereby cause said roller to move along said supporting members.

11. In a device for testing the perforation quality of boxes having tearout openings therein, a base, a cradle for receiving a box to be tested pivoted to said base for movement in a vertical plane, said cradle having upwardly extended portions constituting guide ways, a roller resting on said guide ways for rolling movement therealong, and means on said roller for attaching the end of a tearout portion of the box to said roller, whereby said cradle may be inclined with respect to said base and said roller caused to move along the said guide ways to strip the tearout portion from the box.

References Cited in the file of this patent

UNITED STATES PATENTS

| Number | Name | Date |
| --- | --- | --- |
| 1,095,251 | Washburne | May 5, 1914 |
| 1,273,972 | Wood | July 30, 1918 |
| 1,447,185 | Sammet | Mar. 6, 1923 |
| 1,772,415 | Carpenter | Aug. 5, 1930 |
| 1,989,625 | Nichols | Jan. 29, 1935 |
| 2,306,111 | Scott | Dec. 22, 1942 |
| 2,536,421 | Burhans | May 19, 1948 |
| 2,595,122 | Burhans | Apr. 29, 1950 |
| 2,604,783 | Herrlinger | July 29, 1952 |